US008169965B2

(12) United States Patent
Rexhepi et al.

(10) Patent No.: US 8,169,965 B2
(45) Date of Patent: May 1, 2012

(54) INTER-MODE/INTER-RAT HANDOVER

(75) Inventors: Vlora Rexhepi, Espoo (FI); Iuliana Virtej, Espoo (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 11/570,870

(22) PCT Filed: Jun. 14, 2005

(86) PCT No.: PCT/IB2005/001970
§ 371 (c)(1),
(2), (4) Date: Mar. 24, 2008

(87) PCT Pub. No.: WO2005/125256
PCT Pub. Date: Dec. 29, 2005

(65) Prior Publication Data
US 2008/0304450 A1 Dec. 11, 2008

(30) Foreign Application Priority Data
Jun. 16, 2004 (GB) .................................. 0413484.7

(51) Int. Cl.
*H04W 4/00* (2009.01)
(52) U.S. Cl. ......... 370/331; 370/329; 455/436; 455/339
(58) Field of Classification Search .......... 370/329–333, 370/341; 445/436; 455/336–444
See application file for complete search history.

(56) References Cited

U.S. PATENT DOCUMENTS

| 6,559,753 B1* | 5/2003 | Uchida | 340/7.59 |
|---|---|---|---|
| 6,725,039 B1* | 4/2004 | Parmar et al. | 455/436 |
| 6,963,745 B2* | 11/2005 | Singh et al. | 455/437 |
| 7,054,323 B2* | 5/2006 | Viola et al. | 370/401 |
| 7,181,218 B2* | 2/2007 | Ovesjo et al. | 455/436 |
| 7,260,080 B2* | 8/2007 | Suumaki et al. | 370/342 |
| 7,333,509 B1* | 2/2008 | Gadagottu | 370/467 |
| 7,333,825 B2* | 2/2008 | Hamiti et al. | 455/515 |
| 7,359,347 B2* | 4/2008 | Ahmavaara et al. | 370/328 |
| 7,382,750 B2* | 6/2008 | Wu | 370/331 |
| 7,406,314 B2* | 7/2008 | Sharma | 455/445 |
| 2002/0160785 A1* | 10/2002 | Ovesjo et al. | 455/453 |
| 2002/0191556 A1* | 12/2002 | Krishnarajah et al. | 370/329 |
| 2003/0157935 A1* | 8/2003 | Kauhanen | 455/436 |

(Continued)

FOREIGN PATENT DOCUMENTS
EP 1331832 A2 7/2003
(Continued)

OTHER PUBLICATIONS

3rd Generation Partnership Project; Technical Specification Group GERAN; Packet-switched handover for GERAN A/Gb mode; Stage 2 (Release 6) 3GPP TS 43.129 V6.12.0 (May 2007), pp. 1-79.

(Continued)

*Primary Examiner* — Kent Chang
*Assistant Examiner* — Magdi Elhag
(74) *Attorney, Agent, or Firm* — Harrington & Smith

(57) ABSTRACT

There is disclosed a method of packet switched handover in a communications system having at least two modes of operation, the method comprising, at a terminal of the system, associating identifiers of each mode of operation, and responsive to a packet switched connection handover to a new mode, allocating the connection from an identifier of the existing mode to the associated identifier of the new mode.

28 Claims, 3 Drawing Sheets

U.S. PATENT DOCUMENTS

| | | | |
|---|---|---|---|
| 2004/0147262 A1* | 7/2004 | Lescuyer et al. | 455/434 |
| 2004/0264476 A1* | 12/2004 | Alarcon et al. | 370/395.52 |
| 2005/0108574 A1* | 5/2005 | Haenel et al. | 713/201 |
| 2005/0135311 A1* | 6/2005 | Maillard | 370/331 |
| 2006/0056395 A1* | 3/2006 | Huomo et al. | 370/352 |
| 2006/0098597 A1* | 5/2006 | Kurzmann et al. | 370/331 |
| 2006/0109819 A1* | 5/2006 | Marin et al. | 370/331 |
| 2006/0256749 A1* | 11/2006 | Rexhepi et al. | 370/329 |
| 2006/0281459 A1* | 12/2006 | Marinescu et al. | 455/436 |
| 2007/0281697 A1* | 12/2007 | Davis | 455/436 |
| 2008/0304450 A1* | 12/2008 | Rexhepi et al. | 370/331 |

FOREIGN PATENT DOCUMENTS

| | | |
|---|---|---|
| WO | WO-02080604 A1 | 10/2002 |

OTHER PUBLICATIONS $3^{rd}$ Generation Partnership Project; Technical Specification Group Services and System Aspects; General Packet Radio Service (GPRS); Service description; Stage 2, (Release 6), 3GPP TS 23.060, V6.4.0, Mar. 2004, pp. 1-211.

$3^{rd}$ Generation Partnership Project; Technical Specification Group Services and System Aspects; General Packet Radio Service (GPRS); Service description; Stage 2 (Release 5), 3GPP TS 23.060 V5.1.0 (Mar. 2002), pp. 1-200.

* cited by examiner

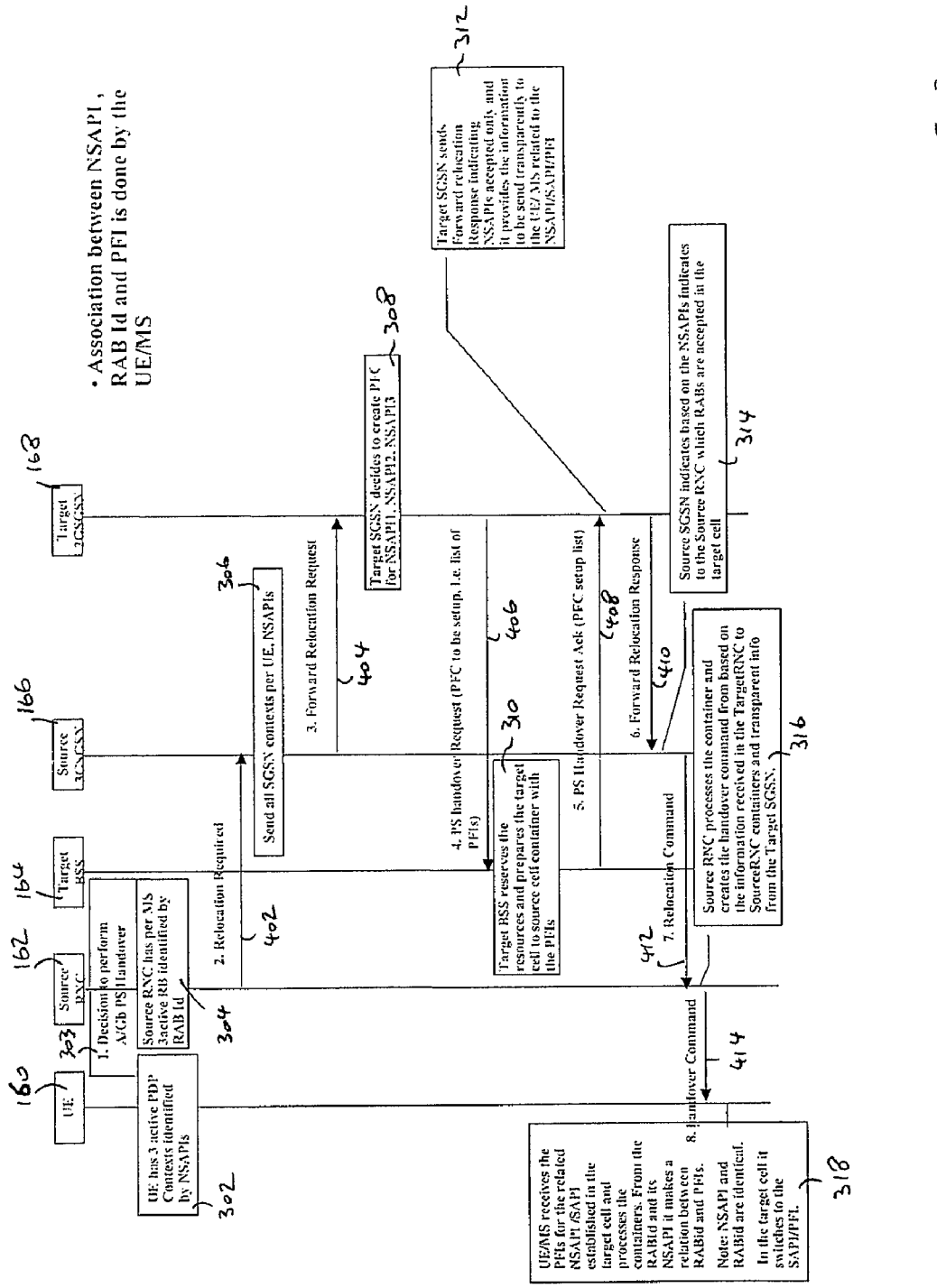

INTER-MODE/INTER-RAT HANDOVER

BACKGROUND TO THE INVENTION

1. Field of the Invention

The invention relates to a technique for the handover of packet-switched data flows, particularly between systems supporting different radio access technologies and/or different modes of operation.

2. Description of the Related Art

The deployment of new radio technologies is typically, at least initially, in geographically limited areas. To meet user coverage needs, it is desirable to provide for a handover to an existing or alternative radio technology when a user moves out of an area supported by new but geographically limited radio technology.

An example is the deployment of the UMTS radio access network (UTRAN), which offers limited geogpraphical coverage, at least initially, in comparison to the more established GSM EDGE radio access network (GERAN). It is proposed, in TSG GERAN, to provide for inter-radio access technology (inter-RAT) packet switched (PS) handover to address this issue. Specifically, it is proposed to provide for a handover between a GERAN A/Gb mode of operation and a UTRAN/CDMA2000 mode of operation.

Within any given radio access technology, there may also be different operational modes. For example, within GERAN there is an A/Gb mode and an Iu mode. TSG GERAN further specifies an inter-mode packet switched (PS) handover between the A/Gb mode and the Iu mode.

In GERAN A/Gb mode a base station subsystem packet flow context (BSS PFC), identified by a packet flow identifier (PFI), may be subject to packet switched (PS) handover. The mobile station (MS) to which this PFC is assigned is therefore also subject to handover.

In GERAN Iu mode and UTRAN a radio access bearer (RAB) identified by a RAB identifier may be subject to relocation, and the user equipment (UE) to which the RAB identifier is assigned is also relocated.

Hereafter, UTRAN mode and GERAN Iu mode are referred to as Iu mode, while A/Gb mode refers to GERAN A/Gb mode.

There is a need to support inter-mode and inter-RAT PS handover and hence seamless interruption of data flows during handover.

Packet switched handover in GERAN A/Gb mode is not yet defined. 3GPP TSG GERAN is currently specifying the packet switched handover in GERAN A/Gb mode. The signaling solution to supporting inter-mode and inter-RAT packet switched handover is presented in TS 43.129 (Stage 2 draft for PS handover in A/Gb mode).

SUMMARY OF THE INVENTION

It is an aim of the invention to provide a mechanism to support inter-mode and/or inter-RAT packet switched handover.

In one aspect the invention provides a method of packet switched handover in a communications system having at least two modes of operation, the method comprising, at a terminal of the system, associating identifiers of each mode of operation, and responsive to a packet switched connection handover to a new mode, allocating the connection from an identifier of the exisiting mode to the associated identifier of the new mode.

Each identifier of a mode may be associated with a common identifier. Each common identifier may identify a packet data protocol context. The common identifiers may comprise network layer service access point identifiers. The identifiers of a first mode may identify packet flow contexts. The identifiers of the first mode may include packet flow identifiers. The first mode of operation may be a GERAN A/Gb mode. The identifiers of a second mode may identify radio access bearers. The identifiers of the second mode may include radio access bearer identifiers. The second mode of operation may be an Iu mode. The Iu mode of operation may be either a GERAN Iu mode of operation or a UTRAN mode of operation.

In a further aspect the invention provides a method of packet switched handover in a communications system having first mode of operation being a GERAN A/Gb mode of operation and a second mode of operation being a UTRAN mode of operation or a GERAN Iu mode of operation, the method comprising, at a terminal of the system, the step of associating a plurality of packet data protocol contexts with both of a plurality of packet flow contexts and a plurality of radio access bearers.

The step of associating may include mapping identifiers of the packet data protocol contexts to identifiers of the packet flow contexts and identifiers of the radio access bearers.

The identifiers may be network layer service access point identifiers, packet flow identifiers, and radio access bearer identifiers.

The association between the plurality of network layer service access point identifiers and the plurality of radio access bearer identifiers may comprise a mapping.

The association between the plurality of network layer service access point identifiers and the plurality of packet flow identifiers may comprise an intermediate association between the network layer service access point identifiers and service access point identifiers.

There may be a mapping between the service access point identifiers and the packet flow identifiers.

The invention also provides in another aspect a terminal for connection in a communication system in at least two modes of operation, wherein there is provided means for handing over at least one established connection between modes, the terminal comprising means for mapping a common identifier to an identifier of a first mode, and means for mapping the common identifier to an identifier of a second mode.

The terminal may further include means, responsive to a handover between modes, for controlling the mapping. The at least one established connection may be a packet switched connection.

There may be provided a set of common identifiers each associated with an established connection; a set of first mode identifiers each for association with an established connection; and a set of second mode identifiers each for association with an established connection.

There may be provided a mapping means for mapping the common identifiers to either the first mode identifiers or the second mode identifiers in accordance with a correct mode of operation.

The terminal may further include input means for receiving notification of a correct mode of operation. The notification may be a handover notification.

In a further aspect the invention provides a mobile communication system comprising a network having at least two modes of operation, and at least one mobile terminal for connection in said network, the network being adapted to provide for handover of packet switched connections on transfer between operating modes, the mobile terminal further being adapted to map a common identifier for an established connection to an identifier for each respective mode of operation, wherein on handover an established connection is transferred from an identifier of one mode to an identifier of a further mode in accordance with said mapping.

The modes of operation may include modes associated with different radio access technologies, the handover being responsive to a switch between radio access technologies within the network. The radio access technologies may include GERAN and UTRAN.

The modes of operation may include different modes within a radio access technology, the handover being responsive to a switch between modes within a radio access technology. The modes may include a GERAN A/Gb mode and a GERAN Iu mode.

BRIEF DESCRIPTION OF THE FIGURES

The present invention is now described with regard to particular examples with reference to the accompanying drawings in which:

FIG. 3 illustrates the signaling and steps carried out in a packet switched handover from a GERAN A/Gb mode to a GERAN Iu mode or UTRAN mode in an embodiment.

DESCRIPTION OF THE PREFERRED EMBODIMENTS

The invention is described herein by way of example with reference to particular example embodiments, in order to clearly illustrate the concepts of the invention, which are not limited to the detail of the described embodiments.

Figure 1:
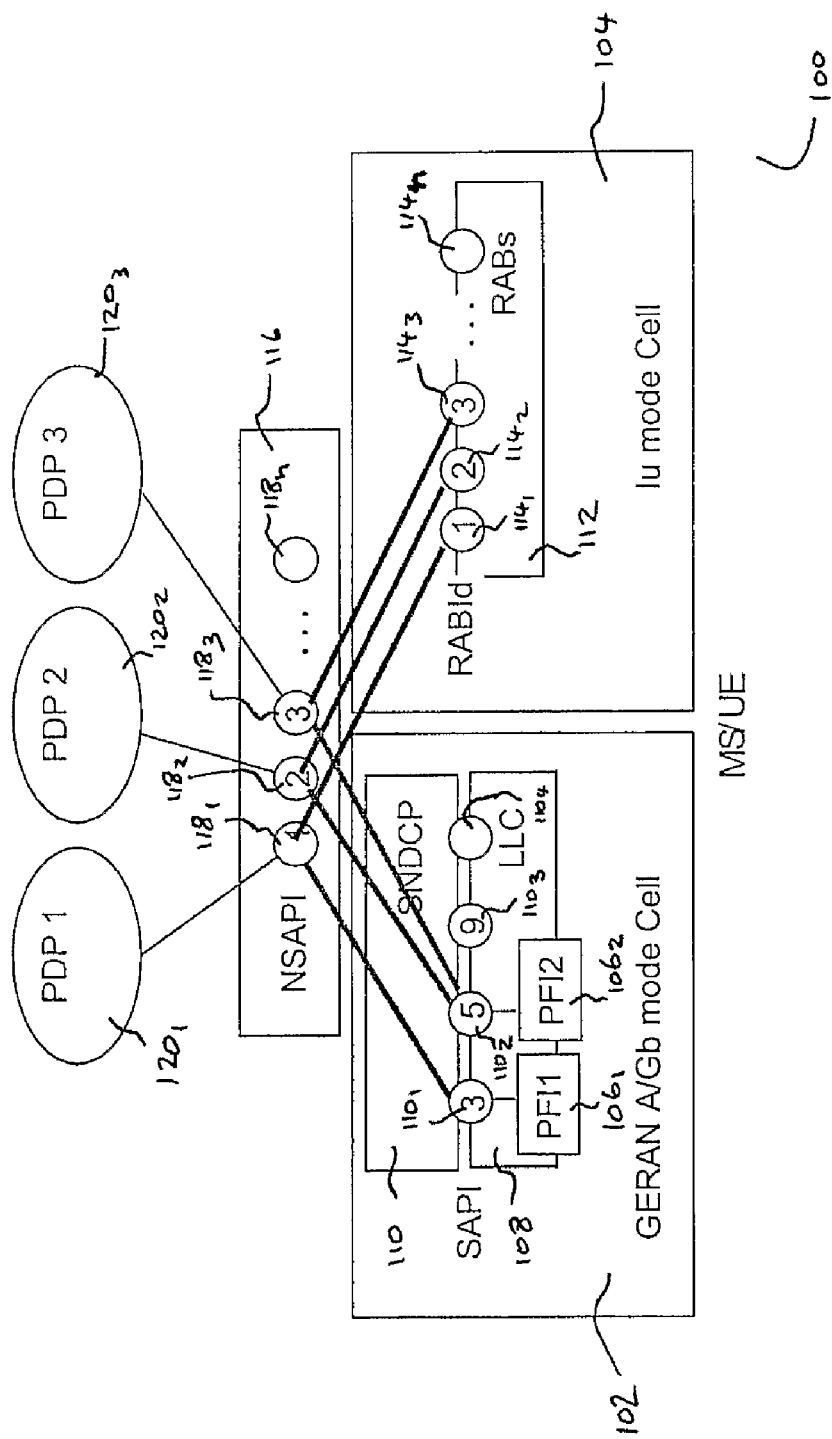
FIG. 1 illustrates the mapping of identifiers between modes in accordance with a preferred embodiment of the invention.

Reference is first made to FIG. 1, which illustrates the relationship of network layer service access point identifiers, service access point identifiers, and packet flow identifiers of a GERAN A/Gb mode cell, and a RAB Id of an Iu mode cell, in the context of a mobile station or user equipment in accordance with a preferred embodiment of the invention.

Referring to FIG. 1, the mobile station or user equipment is generally indicated by reference numeral 100. A block 102 denotes the functional elements utilized when connected in a GERAN A/Gb mode cell. A block 104 denotes the functional elements utilized when connected in an Iu mode cell.

The block 102 includes a subnetwork dependent convergence protocol (SNDCP) functional block 110 and a service access point identifier (SAPI) functional block 108. The SAPI functional block 108 is associated with a number of service access point identifiers $110_1$, $110_2$, $110_3$, $110_4$. The SAPI functional block 108 is also associated with packet flow identifier (PFI) blocks $106_1$, $106_2$, which identify packet flow contexts.

The block 104 includes a radio access bearer (RAB) functional block 112. The RAB functional block 112 is associated with a number of RAB identifiers, denoted RAB Ids, and referred to by reference numerals $114_1$, $114_2$, $114_3$, $114_n$.

The mobile station or user equipment 100 further includes a network layer services access point identifiers (NSAPIs) functional block 116. The NSAPI functional block 116 includes a number of network layer services access point identifiers $118_1$, $118_2$, $118_3$, $114_n$.

A plurality of packet data protocols PDP1, PDP2, PDP3 are denoted by blocks $120_1$, $120_2$, $120_3$. The packet data protocol (PDP) blocks represent session established between the mobile station or user equipment 100 and a network with which connections are established.

The operation of a user equipment or mobile station such as MS/UE 100 of FIG. 1 in different modes is known in the art. The general principles of the handover between modes in accordance with preferred embodiments of the invention is now described further.

In a GERAN A/Gb mode, the operation of which is supported by the functional block 102 in FIG. 1, a subnetwork dependent convergence protocol (SNDCP) of the SNDCP functional block 110 performs multiplexing of network protocol data units (N-PDUs) from one or several network layer service access point identifiers (NSAPIs) 118 onto a logical link connection (LLC) service access point identifier (SAPI) 110. Each of the service access point identifiers is associated with a logical link connection, and may thus be considered to represent a logical link connection.

NSAPIs that are multiplexed onto the same SAPI (or logical link connection) may, for example, use the same radio priority level, quality of service (QoS) traffic handling priority, and traffic class. In a case where BSS packet flow contexts are created (which are identified by PFIs 106) all NSAPIs that are multiplexed onto the same LLC SAPI may, for example, share the same BSS packet flow context, as defined by TS23.060.

There are preferably four SAPI values defined for user data. Default values for SAPIs 3, 5, 9, and 11 have been chosen to correspond with the four GPRS quality of service delay classes, although there is no fixed relationship between SAPI and delay class. These four values correspond, in a preferred embodiment, to the four SAPIs 110. The LLC layer parameters for any SAPI can be negotiated to support any QoS profile. One SAPI is preferably related to one PFI per mobile station or user equipment, and there can be no more than one SAPI utilizing the same PFI per mobile station or user equipment for the same QoS class. There can be several NSAPIs 118 utilizing the same SAPI 110, and thus the same PFI 106 for each mobile station or user equipment. In a GERAN A/Gb mode, there is thus not necessarily a one-to-one mapping between the NSAPIs and the SAPIs.

In an Iu mode, which is supported by the functional block 104 in FIG. 1 there is a one-to-one mapping between the NSAPIs and RAB identifiers.

In the mobile station or user equipment, the NSAPI functional block 116 identifies the packet data protocol service access point (PDP-SAP). In the serving GPRS support node (SGSN) and the gateway GPRS support node (GGSN), the NSAPI identifies the PDP context associated with a PDP address.

Within a BSS context the BSS packet flow contexts are identified by a packet flow identifier (PFI), which is assigned by the SGSN. A BSS packet flow context is shared by one or more activated PDP contexts of the same mobile station or user equipment with identical or similar negotiated QoS profiles.

Thus for the same NSAPI, in GERAN A/Gb mode there is an associated PFI identifying the BSS PFC on the Gb interface and in Iu mode there is an associated RAB Id identifying the RAB on the Iu interface. Both the BSS PFC and RAE have the same QoS traffic class.

In order to support inter-mode and inter-RAT packet switched handover, and seamless transfer of data flows during the handover, there is a need to define the relation/mapping between NSAPIs, PFIs used in GERAN A/Gb mode cell and NSAPIs, RAB Ids used in an Iu mode cell as well as a mechanism to perform this mapping during packet switched handover.

In a preferred embodiment, the invention provides a mapping between:
1. the BSS PFC identified by a PFI and used by a PDP Context identified by a NSAPI in the GERAN A/Gb mode cell; and
2. the RAB identified by a RAB Id to be used by the same PDP Context identified by the same NSAPI in the target Iu mode cell; during inter-mode/inter-RAT packet switched handover from/to GERAN A/Gb mode.

This mapping is preferably done implicitly by the mobile station or user equipment. Note that for the purposes of this description UE (user equipment) is used when the mobile is under control of a UTRAN, and MS (mobile station) is used when the mobile is under control of a GERAN (A/Gb mode or Iu mode). The implicit mapping is done provided that the MS/UE is a node that has knowledge of the identifiers used on both RATs, i.e. GERAN A/Gb mode or GERAN Iu mode/UTRAN as depicted in FIG. 1.

As depicted in FIG. 1 the MS has to associate the same BSS PFC utilized in GERAN A/Gb mode cell with a RAB utilized in the Iu mode cell. This is achieved through a relation with the NSAPI, which as illustrated by the NSAPI functional block 116 in FIG. 1 is the common identifier in both systems, and this relation may be used when applicable.

For example, as depicted in FIG. 1:
1. For PDP Context 1 the mapping relation is:

NSAPI 1–SAPI 3–PFI1–RABId 1=>RAB Id 1 is related to PFI 1.

2. For PDP Context 2 the mapping relation is:

NSAPI 2–SAPI 5–PFI2–RABId 2=>RAB Id 2 is related to PFI 2.

3. For PDP Context 3 the mapping relation is:

NSAPI 3–SAPI 5–PFI2–RABId 3=>RAB Id 3 is related to PFI 2.

For the PDP Context 2 and PDP Context 3 an aggregation is achieved in the GERAN A/Gb mode due to the same QoS traffic class. However aggregation is not supported in the Iu side and therefore both RAB 2 and RAB 3 from the Iu side are associated to the same BSS PFC on the Gb side in this example.

The network nodes do not need to know the associations between the PDP Context identified by NSAPIs, BSS PFC identified by PFI and RABs identified by RAB Id as this relation will only be needed and executed by the MS/UE 100. However in order to enable the MS/UE 100 to perform this mapping relation there is a need for the MS/UE 100 to receive the relevant information from the network. The information needed by the MS/UE 100 depends on the radio access technology of the target cell.

For example, where the target is an Iu mode cell, the MS receives from the target-RNC the target cell container with the radio related parameters for the allocated resources for RABs associated with the NSAPIs. The MS/UE receives from the source-BSS a list of PFIs for the BSS PFC associated with the same NSAPIs for which the resources are allocated in the target cell, i.e. RABs in the target RNC. It is the 'old' SGSN that is able to send the list of accepted PFIs in a PS Handover Command to a source-BSS based on the accepted NSAPIs.

By way of further example, where the target is an A/Gb mode cell the MS/UE receives from the newSGSN the associated PFI for each NSAPI. The MS/UE receives from the targetBSS the radio related parameters for each of the PFIs for the BSS PFC associated with the NSAPIs for which the resources are allocated in the target GERAN A/Gb mode cell.

An example of the detailed solution representing the mapping as well as the node functionalities and the mechanism for sending of the information needed to perform the mapping for both cases from/to GERAN A/Gb mode is given below with reference to FIGS. 2 and 3.

Figure 2:
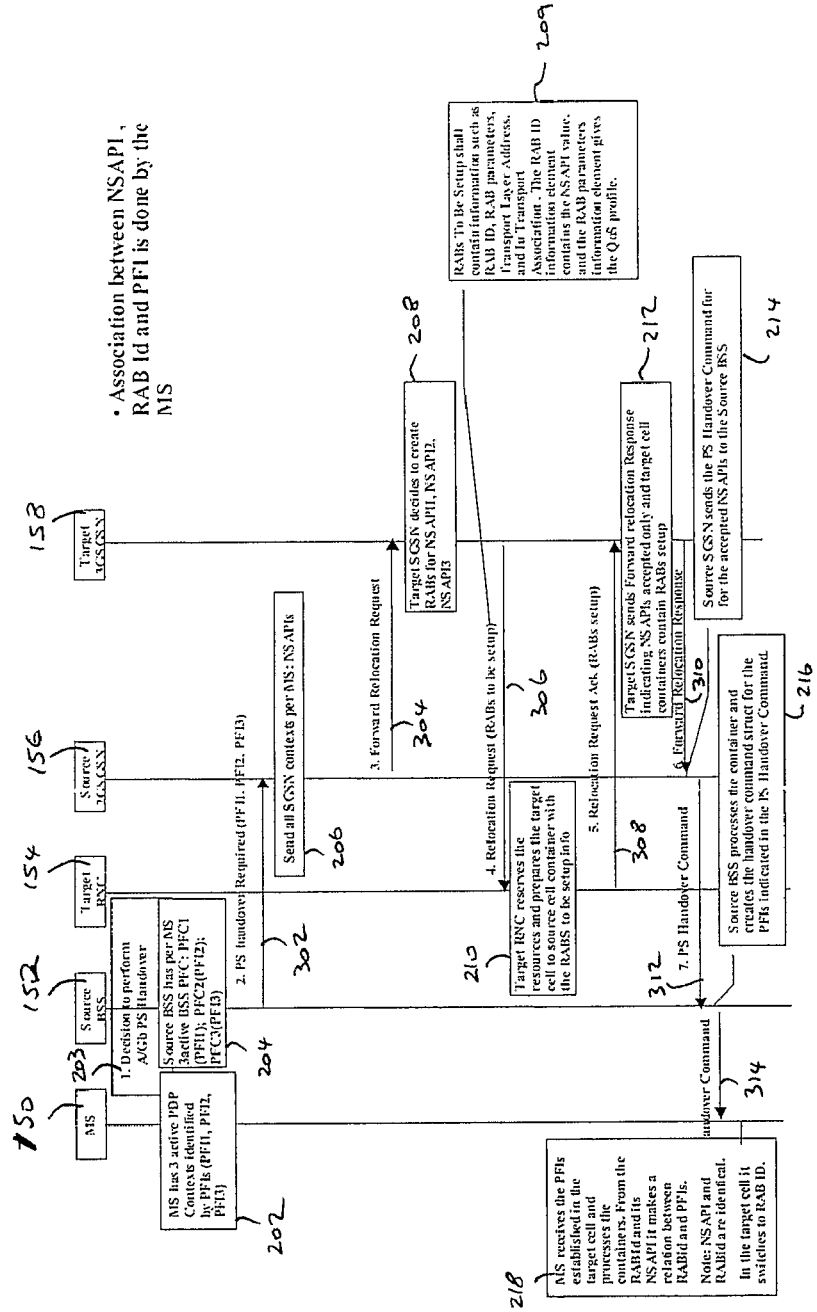
FIG. 2 illustrates the signaling and steps carried out in a packet switched handover from a GERAN Iu mode or UTRAN mode to a GERAN A/Gb mode in an embodiment.

In the first example, with reference to FIG. 2, there is illustrated the packet switched handover from GERAN A/Gb mode to GERAN Iu mode/UTRAN. The Figure illustrates signaling between various entities and the operation of those entities, the entities being a mobile station 150, a source BSS 152, a target RNC 154, a source 2G SGSN 156, and a target 3G SGSN 158. The mobile station 150 may be adapted to operate also as a user equipment.

The entities shown in FIG. 2 have various responsibilities during the packet switched handover.

For the purposes of describing an example, as illustrated in box 202 it is assumed that initially the mobile station has three active PDP contexts. These active PDP contexts may be identified by respective packet flow identifiers PFI1,PFI2,PFI3.

The source BSS 152, as illustrated by box 203, makes the necessary decisions to perform A/Gb PS handover, in accordance with techniques known in the art. The source BSS 152, as illustrated by box 204, has, for each mobile station, three active BSS packet flow controls denoted PFC1,PFC2,PFC3, each respectively associated with the packet flow identifiers PFI1,PFI2,PFI3.

The source BSS 152 initiates packet switched handover from the source BSS 152 to the 2G SGSN 156 for all the active BSS PFCs. This is achieved by the transmission of a "PS Handover Required" signal 302 from the source BSS 152 to the source 2G SGSN 156. This signal includes the packet flow identifiers PFI1,PFI2,PFI3.

The 2G SGSN 156, as illustrated by box 206, sends the multimedia (MM) and packet data protocol (PDP) contexts per mobile station in a "Forward Relocation Request" message 304. NSAPIs and QoS profiles are part of the PDP context. The message 304 is received by the target 3G SGSN 158.

The 3G SGSN 158 for the indicated NSAPIs, based on its local policies, assigns radio access bearer identifiers (RAB Ids) as illustrated by box 208. The RAB Ids are created for NS API1, NS API2, and NS API3.

The 3G SGSN 158 sends the RABs to be setup in a "Relocation Request" message 306 to the target RNC 154. As illustrated in box 209, the RABs-to-be-setup information contains information such as the RAB Id, the RAB parameters, the transport layer address, and the Iu transport association. The RAB Id information element contains the NS API value, and the RAB parameters information element gives the QoS profile.

The target RNC 154, as illustrated by block 210, reserves the RNC resources and prepares the target cell to source cell container containing the RAB information for the RABs to be setup.

The information relating to the RABs to be setup is sent in a "Relocation Request ACK" message 308 to the 3G SGSN 158.

The 3G SGSN 158 sends accepted NSAPIs together with the radio related containers to the 2G SGSN 156 using a "Forward Relocation Response" message 310. As illustrated by box 212 the target 3G SGSN sends a forward relocation response indicating the NSAPIs accepted only, and the target cell containers contain RABs setup. The target cell radio related containers have the RABs setup information.

The 2G SGSN 156, based on the received and accepted NSAPIs, sends a "PS Handover Command" message 312 to the source BSS 152 as illustrated by box 214. As illustrated by box 216, the source BSS 152 processes the container and creates the handover command structure for the PFIs indicated in the PS Handover Command message.

The source BSS 152 further then sends a "PS Handover Command" message 314 to the mobile station 150.

As illustrated by box 218, the MS 150 then processes the radio related containers, where the RABs to be setup are indicated, based on receipt of the PFIs established in the target cell. The MS 150 also receives the accepted PFIs for the NSAPIs for which the RABs are relocated/established in the target cell. The MS, provided that there is one-to-one mapping between the RAB Id and the NSAPI, then performs the mapping between the BSS PFC identified by the PFIs used by this NSAPI in the GERAN A/Gb mode cell, and the RAB identified by the RAB Id to be used by this NSAPI in the target cell.

The NS API and the RAD Id are identical. In the target cell there is a switch to the RAD Id.

In the second example, with reference to FIG. 3, there is illustrated the packet switched handover from GERAN Iu mode/UTRAN to GERAN A/Gb mode. The Figure illustrates signaling between various entities and the operation of those entities, the entities being a user equipment 160, a source RNC 162, a target BSS 164, a source 3G SGSN 166, and a target 2G SGSN 168. The user equipment 160 may be adapted to operate also as a mobile station.

The entities shown in FIG. 3 have various responsibilities during the packet switched handover.

It is assumed initially, as illustrated by box 302, that the user equipment 160 has three active PDP contexts, identified by appropriate NSAPIs. As is known in the art, and is illustrated by box 303, the source RNC 162 makes a decision to perfom A/Gb PS handover. At this point, as illustrated by box 304, the source RNC 162 has three active radio access bearers identified by respective radio access bearer identifiers, RAB Ids.

The source RNC 162 sends a "Relocation Required" message 402 to the source 3G SGSN 166 for all the RABs for the active PDP contexts identified by the NSAPIs.

The 3G SGSN 166, as illustrated by box 306, sends the multimedia (MM) and PDP contexts per user equipment or mobile station in a "Forward Relocation Request" message 404. The NSAPIs and the QoS profiles are part of the PDP context, and thus forwarded in the message 404.

The 2G SGSN 168, as illustrated by box 308, creates BSS PFCs for the indicated NSAPIs based on its local policies, assigns PFIs for each, and sends the PFCs to be setup, i.e. a list of PFIs, inside a "PS Handover Request" message 406 to the target BSS 164.

The target BSS 164, as illustrated bu box 310, reserves the resources and prepares the target cell to source cell container containing the PFIs information.

The information related to the PFCs to be setup is then sent in a "PS Handover Request Ack" message 408 to the 2G SGSN 168. The message 408 includes the PFC setup list.

The 2G SGSN 168 then sends a "Forward Relocation Response" message 410 indicating the NSAPIs accepted and the related PFIs. The message 410, as denoted by box 312, provides the information to be sent transparently to the user equipment or mobile station related to the NSAPI/SAPI/PFI.

The 3G SGSN 166, as illustrated by box 314, indicates to the source RNC 162 which RABs are relocated in the target cell based on the accepted NSAPIs. It also forwards transparently the PFIs related to these NSAPIs to the source RNC 162 by a "Relocation Command" message 412.

The source RNC 162 processes the information received, as illustrated by box 316, and then sends a "Handover Command" message 414 to the user equipment 160. The processing by the source RNC 162 includes processing the container and creating the handover command based on the information received in the target RNC to source RNC containers and transparent information from the target RNC.

The user equipment 160 receives the PFIs related to the NSAPI/SAPI established in the target cell from the containers and process the containers, as illustrated by box 318. The user equipment also receives the accepted RABs from the source RNC 162, and provided that there is one-to-one mapping between a RAB Id and a NSAPI, performs the mapping between the BSS PFC identified by PFIs to be used by this NSAPI in the GERAN A/Gb mode target cell.

In the target cell the NSAPI and the RAB Id are identical. The target cell switches to the SAPI/PFI.

The invention is described herein by way of reference to particular preferable embodiments. The invention is not, however, limited to the implementation details of these embodiments, and is more generally applicable. The scope of protection afforded by the invention is defined by the appended claims.

The invention claimed is:

1. A method of packet switched handover in a communications system having at least two modes of operation, the method comprising, at a terminal of the system, associating identifiers of each mode of operation with a common identifier, and responsive to a packet switched connection handover to a new mode, allocating the connection from an identifier of the existing mode to the associated identifier of the new mode.

2. A method according to claim 1 in which each common identifier identifies a packet data protocol context.

3. A method according to claim 1 in which the common identifiers comprise network layer service access point identifiers.

4. A method according to claim 1 in which the identifiers of a first mode identify packet flow contexts.

5. A method according to claim 4 wherein the identifiers of the first mode include packet flow identifiers.

6. A method according to claim 4 wherein the first mode of operation is a GERAN A/Gb mode.

7. A method according to claim 1 in which the identifiers of a second mode identify radio access bearers.

8. A method according to claim 7 wherein the identifiers of the second mode include radio access bearer identifiers.

9. A method according to claim 7 wherein the second mode of operation is an Iu mode.

10. A method according to claim 9 wherein the Iu mode of operation is either a GERAN Iu mode of operation or a UTRAN mode of operation.

11. A method of packet switched handover in a communications system having first mode of operation being a GERAN A/Gb mode of operation and a second mode of operation being a UTRAN mode of operation or a GERAN Iu mode of operation, the method comprising, at a terminal of the system, the step of associating a plurality of packet data protocol contexts with both of a plurality of packet flow contexts and a plurality of radio access bearers.

12. A method according to claim 11 wherein the step of associating includes mapping identifiers of the packet data protocol contexts to identifiers of the packet flow contexts and identifiers of the radio access bearers.

13. A method according to claim 12 wherein the identifiers are network layer service access point identifiers, packet flow identifiers, and radio access bearer identifiers.

14. A method according to claim 13 wherein the association between the plurality of network layer service access point identifiers and the plurality of radio access bearer identifiers comprises a mapping.

15. A method according to claim 13 wherein the association between the plurality of network layer service access point identifiers and the plurality of packet flow identifiers comprises an intermediate association between the network layer service access point identifiers and service access point identifiers.

16. A method according to claim 15 wherein there is a mapping between the service access point identifiers and the packet flow identifiers.

17. A terminal for connection in a communication system in at least two modes of operation, wherein there is provided means for handing over at least one established connection between modes, the terminal comprising means for associating an identifier of a first mode with a common identifier, and means for associating an identifier of a second mode with the common identifier.

18. A terminal according to claim 17 further including means, responsive to a handover between modes, for controlling the associating.

19. A terminal according to claim 17 wherein the at least one established connection is a packet switched connection.

20. A terminal according to claim 17 wherein there is provided a set of common identifiers each associated with an established connection; a set of first mode identifiers each for association with an established connection; and a set of second mode identifiers each for association with an established connection.

21. A terminal according to claim 20 wherein there is provided an associating means for associating the common identifiers to either the first mode identifiers or the second mode identifiers in accordance with a correct mode of operation.

22. A terminal according to claim 21 further including input means for receiving notification of a correct mode of operation.

23. A terminal according to claim 22 wherein the notification is a handover notification.

24. A mobile communication system comprising a network having at least two modes of operation, and at least one mobile terminal for connection in said network, the network being adapted to provide for handover of packet switched connections on transfer between operating modes, the mobile terminal further being adapted to associate a common identifier for an established connection with an identifier for each respective mode of operation, wherein on handover the established connection is transferred from the identifier of one mode to an identifier of a further mode in accordance with said associating.

25. A mobile communication system according to claim 24 wherein the modes of operation include modes associated with different radio access technologies, the handover being responsive to a switch between radio access technologies within the network.

26. A mobile communication system according to claim 25 wherein the radio access technologies include GERAN and UTRAN.

27. A mobile communication system according to claim 24 wherein the modes of operation include different modes within a radio access technology, the handover being responsive to a switch between modes within a radio access technology.

28. A mobile communication system according to claim 27 wherein the modes include a GERAN A/Gb mode and a GERAN Iu mode.

* * * * *